June 19, 1962 A. LACAZE ETAL 3,039,275
PIPING SYSTEM FOR THE TRANSPORT OF LIQUIFIED GASES
Filed Nov. 3, 1959 3 Sheets-Sheet 3

3,039,275
PIPING SYSTEM FOR THE TRANSPORT OF
LIQUIFIED GASES
Albert Lacaze, Jaures a Grenoble, and Louis Weil, La
Tronche, France, assignors to Commissariat a l'Energie
Atomique, Paris, France
Filed Nov. 3, 1959, Ser. No. 850,564
Claims priority, application France Nov. 5, 1958
10 Claims. (Cl. 62—45)

The present invention relates to piping systems for fluids, and particularly to piping systems for fluids which must remain at a temperature which differs from the environmental temperature, the amount of heat transfer to the atmosphere being kept at the lowest possible value. The invention more particularly relates to piping systems which are made up of a number of pipe lengths joined together end to end.

The various problems resulting from the expansions or contractions brought about by the fact that hotter or colder than ambient fluids are transported, are well known. These prevail particularly around the joints between the pipes.

Thus, the piping of liquified gases at very low temperature is a very delicate operation. These temperatures which are of the order of twenty degrees absolute in the case of hydrogen, for example, make it so that when a liquified gas is introduced in a piping system, some highly appreciable contractions occur. As a consequence it has been found preferable to use continuous lengths of piping of limited length and join them together by means of suitable joint elements. It is further necessary to keep at a minimum the thermal exchanges between the liquified gas and the exterior and also the leaks which could in the case of some gases be explosive.

The new piping systems according to the invention are particularly well suited for the transportation of liquified gases at very low temperature; they satisfy the above mentioned conditions and are besides simple and expedient to build.

According to the invention, in piping systems, consisting of several conduits connected end to end, a terminal section of each conduit is placed in a prismatic shape junction box of which it penetrates two adjacent sides; this section of the conduit inside the box, is bent with respect to the remainder of the conduit; it extends externally from the box for a short length of the said terminal section, also bent so as to meet a similar end of a second conduit to which it is connected.

Thus the ends of the terminal sections are connected end to end externally from the said junction box, but close to it, in the proximity of one or two openings in the side of the box from which protrude the terminal sections.

A preferred embodiment of the invention includes a box in the shape of a triangular prism and preferably of a right triangular prism. In this case, the most practical layout consists in leading the conduits to be connected to the pair of opposed lateral faces of the prism which intersect at an angle of 90° and to extend their terminal section through beyond the third lateral face.

At least a fraction of the terminal sections of conduits is made up preferably of pliable tubing, such as for instance a bellows or a length of a very malleable metal compatible with the fluid to be carried by the system.

There are therefore tubes which are at the same time pliable and bent in the shape of a bow, being submitted to lesser stresses than the straight bellows, already known in the art, placed axially with respect to the conduits to be connected; it is thus possible to make use of thinner tubes and do away with the usual means of reinforcing which are cumbersome from the thermal as well as the structural points of view.

As in other systems of piping joints, the end of the pipes can be, as the case may be, welded, joined together in a leakproof manner by mechanical joints, tight straps, sleeves etc.

It is good practice to surround the joints with a thermal insulator or with one or several shields having preferably a high power of reflection towards the outside.

A method in accordance with the invention which has proved particularly practical consists in using a prismatic box with perforated lateral sides, and to apply and secure to these sides some plates which are themselves secured to the ends of the sleeve. This method will be described more fully later when an embodiment will be more fully described.

The invention is applicable to very diverse piping systems but it is particularly well suited to the transport of liquified gas at very low temperature, and it is with respect to such an application that hereinafter will be described the other characteristics of the invention.

The losses by radiation are limited by circulating the liquified gas in a conduit having a high reflection coefficient. To reduce at a minimum the thermal exchanges, it is possible to centrally locate the tube by means of braces which are relatively poor heat conductors, such as for instance of stainless steel, inside of a sleeve cooled by the circulation of a gas, a liquified gas of which the boiling point is at a higher temperature than that of the gas which is to be transported, the walls of this sleeve being of a high reflection coefficient.

The sleeve may be made up either of two coaxial copper tubes centered with respect to each other by turns of copper tubing, or of a single tube supporting the conduit of liquified gas and used as a thermal insulator. Means have been foreseen to realize such a circulation by starting with an appropriate liquified gas.

The unit described above is insulated with respect to the ambient temperature by an envelope in which a vacuum is created and within which it is suspended by means of articulated hooks disposed here and there. The vacuum may be replaced by an insulating material.

If the hooks are used, they are longitudinally offset (FIG. 1) so that they may occupy under cold conditions a position symmetrical with that under warm conditions with respect to their suspension point.

The expansion joints linking together two tubing or sleeving elements are in the shape of a bow or stirrup made up of two elbows and two metallic flexible bellows or "tombacs," or any other equivalent pliable device.

During installation, the lateral branches of the stirrups are displaced toward each other so that their contracting movement, when cold, will be limited, thereby reducing the strains imposed on the metal of which they are made.

The tightness of the various components of the box is insured by means of, for instance, O-ring joints.

Referring to the schematic FIGURES 1 to 4 hereunto annexed, it will be described hereinafter, an embodiment of the invention. This should in no way be considered as having a limiting influence upon the scope of the invention.

Only those elements which were believed to be essential to a good understanding of the invention have been assigned reference numerals. Like numerals refer to identical parts in all the figures.

In the example hereinafter described, the gas is hydrogen, but it must be understood that other gases such as helium could also be piped in a similar fashion.

Figure 1:
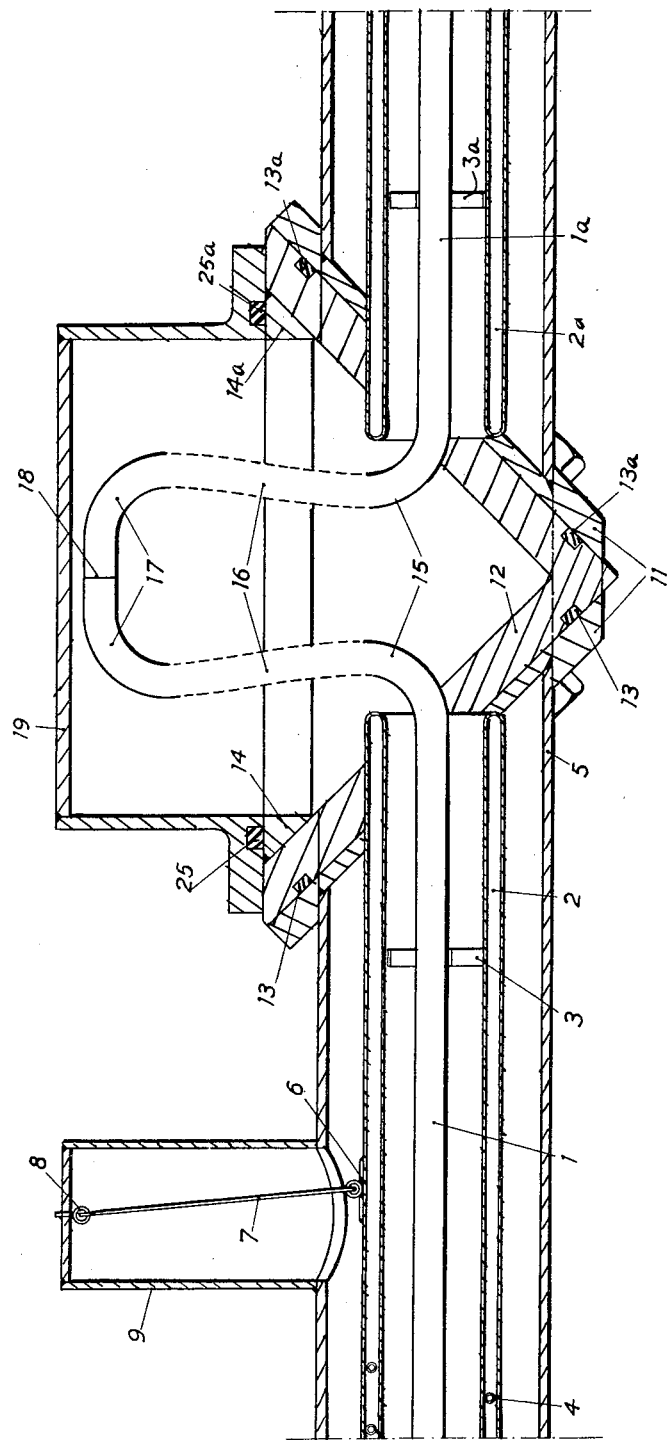
FIGURE 1 is a section showing an assembly of pipes and a connection box according to the invention.

In FIGURE 1, a silver coated conduit or pipe 1, in which circulates liquid hydrogen is surrounded by a double walled sleeve 2, in which circulates liquid nitrogen. The centering of pipe 1 within the sleeve is effected by means of braces 3 of stainless steel: the sleeve 2 is made up of two coaxial copper tubes which do not extend into box 12; the centering of the tubes is effected here and there by means of tubular copper spirals 4; the sleeve 2 is externally silvered.

The insulation of the pipe 1 from the sleeve 2 is realized by creating a vacuum in the space between them. The sleeve 2 is supported at several appropriately chosen points by means of hooks 6 welded to sleeve 2; rods 7 articulated on hooks 6 and hanging points 8, support the sleeve 2 in a position which is sensibly coaxial with that of shield 5. The whole suspension means is located in a cylindrical casing 9 opening into sleeve 5. The position of the hooks 6 is slightly offset to one side longitudinally so that, when the cold conditions prevail they adopt a position which is symmetrical with their position under hot conditions, with respect to the axis of the casing 9.

Figure 2:
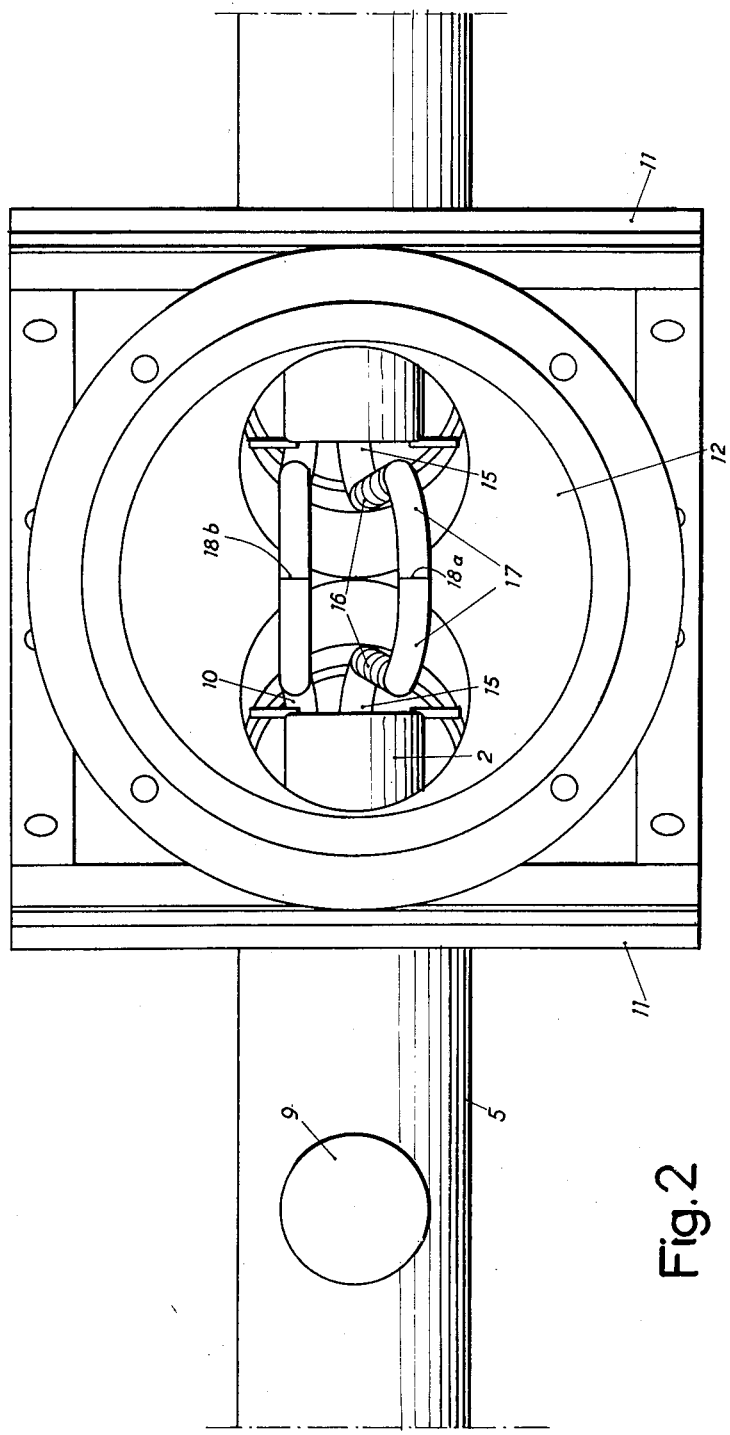
FIGURE 2 is a plan view of an assembly as in FIGURE 1 but with the cover removed.

The end of these conduits is fashioned thus:

The sleeve 2 is closed and is connected to a pipe 10, shown on FIGURE 2 only, used for circulating the nitrogen.

Symmetrically with respect to 1, 2 and 5 and on the other side of the connection box 12, analogous elements to which the corresponding reference number with a letter suffix such as 1a, 2a, 3a etc. are applied, can be found. These elements belong to a second length of piping, the task being to connect it to the first length, especially conduit 1 to conduit 1a.

To make such a connection, plates 11 and 11a are welded to the ends of sleeves 5 and 5a respectively in a 45° relation with respect to the axes of the said sleeves. Each of plates 11 and 11a has an aperture which coincides with that of the sleeve itself (see FIGS. 1 and 4). The plates have dimensions and shapes so chosen that they can be applied against the respective sides of the connection box.

The ends of conduits 1 and 1a, beyond sleeves 5 and 5a and terminal plates 11 and 11a, are bent at 15 and 15a; these are connected to soft and pliable metallic sections 16 and 16a. The same procedure applies to pipes 10 and 10a, visible in FIGURE 2 only.

Figure 4:
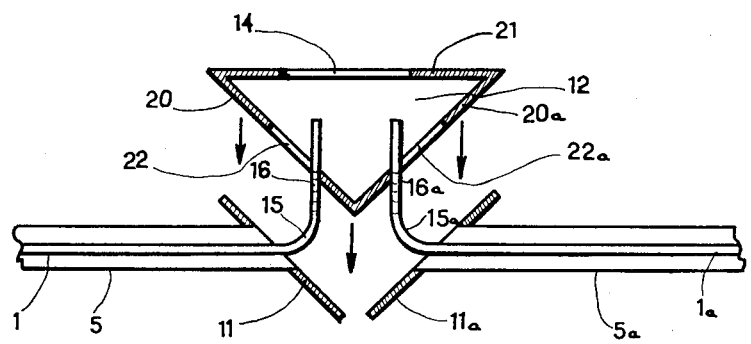
FIGURE 4 is a section showing in exploded form the elements of a connection box.

The plates 11 and 11a are placed face to face, as shown diagrammatically in FIGURE 4; a prismatic box 12 having large apertures 22 and 22a and 14 on three of its sides is then lowered in position between them.

In box 12 as shown the angle between sides 20 and 20a is 90°.

On account of the slope of plates 11, 11a and of sides 20, and 20a, the former can be applied against the latter while allowing the terminal sections of the conduits respectively 15—16 and 15a—16a, to freely penetrate apertures 22, 22a and 14.

It is understood that in the case of box 12, of rectangular section (sides 20 and 11 perpendicular to 23) this operation would not be as easy because the parts 15—16 would have to be bent during the lowering of the box into position if these parts are to penetrate through the apertures.

Plate 11 is then secured to face 20 by welding or by means of bolts and nuts or the like, joint seal or gasket 13 (see FIGS. 1 and 3) being inserted between the surfaces. Similar construction is used with elements 11a, 20a, 13a. The ends of conduits 16 and 16a lie outside of box 12, over the aperture 14. If they have not been already bent according to 17 and 17a this operation is carried out at this time; it remains to connect the ends 17 and 17a to each other. By means of the play of elbows 15, 15a and 17, 17a, the end sections of conduits 1 and 1a when connected have the shape of a bow or stirrup; similarly with conduits 10 and 10a.

After assembly by brazing or screw joint, or by alloying with lead, with gold or with indium for instance, the half stirrups at 18 and 24, a cover 19, provided with an O-ring joint 25, is placed over the connection box.

The joining by brazing of the half stirrups is very easy because of the absolute accessibility of the device externally from the connection box. It is necessary to weld the stirrup in a slightly closed attitude so that, when cold, its opening being limited, the strains applied to the metal will be at their minimum.

It must also be understood that the construction described applies just as well to conduits at angle to each other. Notably, instead of being placed perpendicular to the axes of sleeves 5 and 5a, the plates 11 and 11a can be applied to two adjacent sides of box 12. On the other hand the box proper can have sides between which the angles are different from those illustrated.

Figure 3:
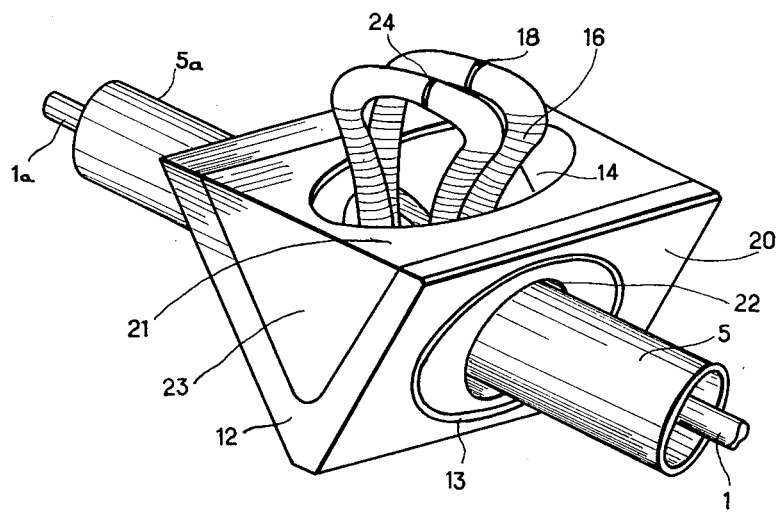
FIGURE 3 is a more detailed view in perspective of an element of the connection boxes.

Another method of fabricating the box 12 consists in starting with an angle iron indicated by reference numeral 12 of FIGURE 3, and securing to it as by welding a prefolded sheet of metal corresponding to faces 21—23. The whole is thereafter machined and punctured with openings 14, 22, 22a while grooves are provided to receive joints 13 and 13a. On FIG. 3, 13a and 22a are hidden but they are located behind the box 12 symmetrically with respect to 13 and 22. The plates 11 and 11a and sleeve 5 and 5a are not shown on that figure either.

The piping systems described hereinbefore, make it possible by simple means, to transport liquid hydrogen or any other liquified gas having a boiling point lower than that of nitrogen by keeping in check the losses due to radiation and their consequent vapour lock effect, which is particularly useful in cases where the liquefaction plant is remote from the plant where it is utilized.

Evidently, for gases such as oxygen that have relatively high boiling points, the device described, according to the invention, is applicable but in such a case, it is possible to eliminate the use of an insulating gas and of sleeve 2.

We claim:

1. In a piping system for the transport of fluids at low temperatures, a first conduit, a second conduit, a prismatic shaped junction box having two opposed sides and a third side connecting said opposed sides, said first conduit entering said box through one of said opposed sides, said second conduit entering said box through the other of said opposed sides, an elbow in said first conduit extending through said third side, an elbow for said second conduit extending through said third side, means for connecting said elbows in fluid-tight relationship outside of said box, a cover for said box sealed thereto and enclosing said elbows and said connecting means, a first sleeve surrounding said first conduit and sealed to the adjacent one of said opposed sides, a second sleeve surrounding said second conduit and sealed to the other of said opposed sides, a first double walled tube spaced from and surrounding said first conduit and spaced from said first sleeve and terminating within said box and a second double walled tube spaced from and surrounding said second conduit and spaced from said second sleeve and terminating within said box.

2. A piping system as described in claim 1, said box being triangular in transverse section, each of said opposed sides being located obliquely with respect to the corresponding one of said conduits.

3. A piping system as described in claim 1 in which said elbows each include a flexible section.

4. A piping system as described in claim 1, said means for connecting said elbows including a part on each of said elbows and means for engaging said parts in fluid-tight relationship.

5. A piping system as described in claim 2 including a plate for each of said sleeves sealed thereto adjacent said box and sealed to the adjacent one of said opposed sides.

6. A piping system as described in claim 1, said opposed sides being disposed at 90° to each other and each of said sides being disposed at 45° to the corresponding one of said conduits.

7. A piping system as described in claim 1 including thermal insulating material within said double walled tubes.

8. A piping system as described in claim 1, including a plurality of horizontally and spaced hooks attached between said double walled tubes and said sleeves, each of said hooks being offset longitudinally for contraction of said tubes.

9. A piping system as described in claim 8 including a casing opening into the corresponding sleeve for each of said hooks and a hanger in each of said casings receiving the corresponding hook.

10. A piping system as described in claim 1 including reflector shields adjacent said elbows in said box.

References Cited in the file of this patent

UNITED STATES PATENTS

| | | |
|---|---|---|
| 197,589 | Bargmann | Nov. 27, 1877 |
| 240,236 | Delaney | Apr. 19, 1881 |
| 256,543 | Buel | Apr. 18, 1882 |
| 264,722 | Mackintosh | Sept. 19, 1882 |
| 1,081,963 | Holloway | Dec. 23, 1913 |
| 1,495,066 | Browne | May 20, 1924 |
| 2,396,549 | Dana | Mar. 12, 1946 |
| 2,732,227 | Kaiser | Jan. 24, 1956 |
| 2,785,536 | Hinckley | Mar. 19, 1957 |
| 2,946,197 | Lassen-Nielsen | July 26, 1960 |